United States Patent [19]

Nishio

[11] Patent Number: 4,951,531
[45] Date of Patent: Aug. 28, 1990

[54] TIRE PUNCTURE MENDING TOOL

[76] Inventor: Tatsuji Nishio, 2-52, Sarayama 3-Chome, Minami Ku, Fukuoka-Shi, Fukuoka, 815, Japan

[21] Appl. No.: 385,939

[22] Filed: Jul. 21, 1989

Related U.S. Application Data

[63] Continuation of Ser. No. 243,562, Aug. 18, 1988, abandoned.

[51] Int. Cl.⁵ ............................................. B60C 25/16
[52] U.S. Cl. ..................................................... 81/15.7
[58] Field of Search ...................... 81/15.2, 15.5, 15.7, 81/438, 439, 490

[56] References Cited

U.S. PATENT DOCUMENTS

| | | | |
|---|---|---|---|
| 386,263 | 7/1888 | Pedersen | 81/438 X |
| 2,527,492 | 10/1950 | Cleary et al. | 81/438 X |
| 3,029,671 | 4/1962 | Clifford | 81/15.7 |
| 4,009,624 | 3/1977 | Nishino | 81/15.7 |
| 4,404,874 | 9/1983 | Lieser | 81/438 |
| 4,548,102 | 10/1985 | DiRocco et al. | 81/15.7 |
| 4,581,961 | 4/1986 | Lai | 81/438 X |
| 4,631,770 | 12/1986 | Goldberg | 81/490 X |

FOREIGN PATENT DOCUMENTS

| | | | |
|---|---|---|---|
| 2856656 | 7/1980 | Fed. Rep. of Germany | 81/15.7 |
| 805007 | 11/1958 | United Kingdom | 81/15.7 |

Primary Examiner—James G. Smith
Attorney, Agent, or Firm—Jordan and Hamburg

[57] ABSTRACT

A tire puncture mending tool of the invention consists of a tool rod having a pointed end formed into a drill and a portion near the base end formed with a turn preventive key, a holder allowing both forward and reverse installation and removal of the tool rod and having the top formed internally with keyways with which said key engages to stop the rotation of the rod as well as any further insertion beyond a given length thereof, and a sheath to loosely fit around the rod attached to the holder to secure the tool thereto, the inside diameter of said sheath being nearly equal to the diameter of a filling plug to be loaded therein.

2 Claims, 4 Drawing Sheets

TIRE PUNCTURE MENDING TOOL

This application is a continuation of application Ser. No. 243,562, filed Aug. 18, 1988 now abandoned.

FIELD OF ART

The invention relates particularly to a puncture mending tool for tubeless tires.

BACKGROUND OF THE INVENTION

A filling plug for and means of externally mending punctures of tubeless tires have been disclosed by the present applicant in Publication No. 54-175704.

The filling plug, as shown in FIG. 10, has the upper and lower ends 2 and 3 formed with a larger flange than the outside diameter of a cylindrical main body 1 respectively, and an aggregate 4 embedded in the center of said main body 1 so as to connect the flanged ends 2 and 3, the outer layer 5 of said main body 1 being of unvulcanized rubber and the rest thereof being of vulcanized rubber except the aggregate 4. The aggregate 4 prevents the plug from getting cut and separated by tire steel cords due to the standing wave phenomenon of the tire while running. In addition, the flanged parts 2 and 3 act to prevent the plug inserted from falling from the top and protect the periphery thereof.

A process and tools for mending punctured tires by the use of said filling plug have been disclosed by the present applicant in the specifications of U.S. Pat. No. 4,009,624 and Canadian Pat. No. 952423 wherein a puncture is mended by means of a first tool having a drill to be inserted into the puncture and a second tool having a push rod with which the filling plug is pushed into a sheath guide forced in screwed engagement with the first tool into the puncture and left therein. In this case it is necessary to avoid mislaying two separate tools.

The object of the present invention is to eliminate the inconvenience associated with the tools of the prior art described above and the need of supplying plural types of tools.

DISCLOSURE OF THE INVENTION

The present invention is a means of mending punctured tires consisting of a tool rod having one end in the form of a drill and a portion near the other base end in the form of a turn preventive key; a holder allowing both the forward and reverse installation and removal of said tool rod and having keyways formed inside the top for engagement with the key, which prevents the turning of the rod and stops any further insertion of the rod beyond a given length thereof; and a sheath to be loosely fit around the rod secured in the holder, the sheath having the inside diameter nearly equal to that of the filling plug to be loaded therein.

PREFERRED EMBODIMENT OF THE INVENTION

Figure 1:
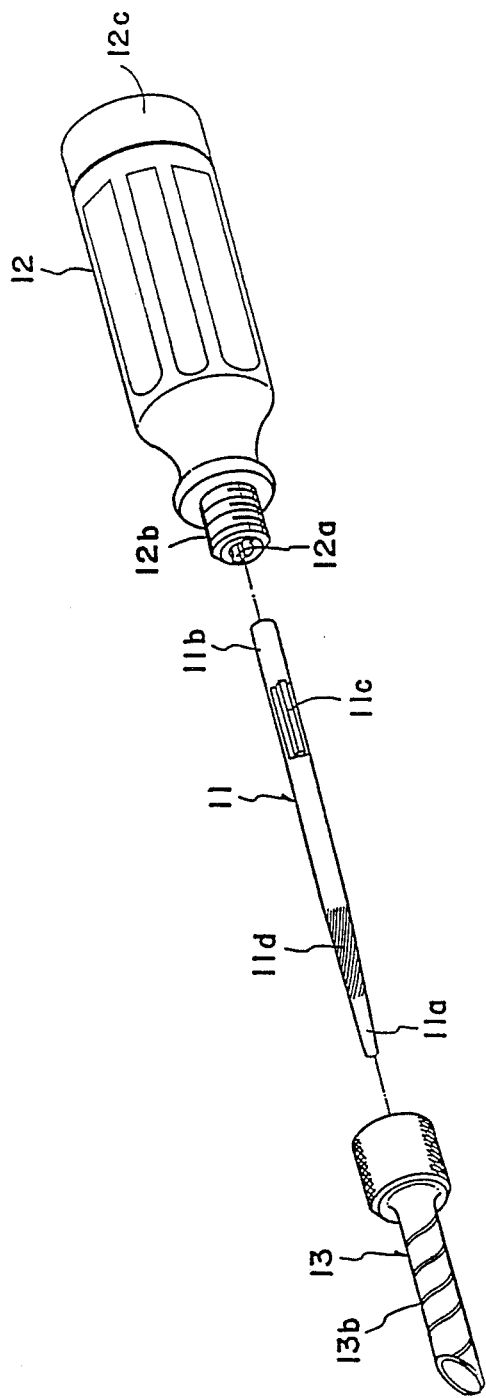
FIG. 1 is an exploded perspective view showing an embodiment of the invention.

Hereinafter, the invention is described referring to the drawings showing embodiments thereof.

FIG. 1 is an exploded perspective view of a mending tool of the invention, where 11 indicates a tool rod having a point formed as a drill 11a, a base end formed as a push rod 11b, and a key portion 11c near the base end acting as a turn preventive and stopper to prevent turning and any further insertion of the tool rod in a holder 12, the peripheral surface of the pointed end being provided with spiral grooves 11a which facilitate the screw-in of the rod into a puncture. The top end of the holder 12 is internally provided with the keyways 12a to fit the key 11c and externally provided with male screw 12b. The holder 12 which is hollow can accommodate articles necessary for mending punctures such as filling plugs and tubes of vulcanization accelerant, 12c indicating the cap thereof. 13 indicates a sheath internally provided with a female screw 13a to be engaged with the male screw 12b of the holder 12 as shown in FIG. 2 and externally provided with spiral grooves, the sheath being beveled to form a pointed end.

Figure 2:
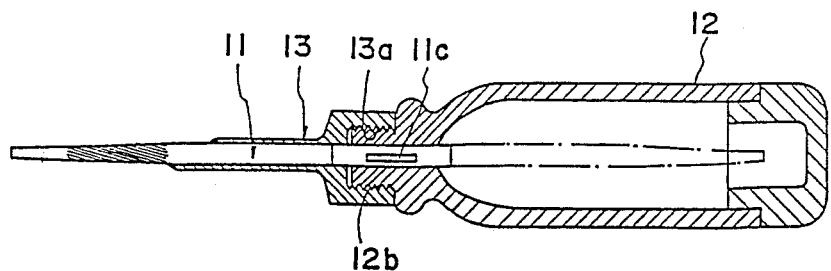
FIG. 2 is a cross-sectional view of the assembly.

FIG. 2 is a cross-sectional view showing the components assembled into a tool.

Hereinafter, description is given of a process for mending a punctured tire by means of the above described embodiment of the invention.

Figure 3:
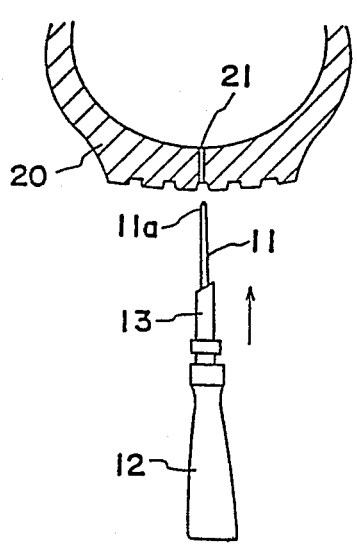
FIGS. 3 to 8 are sequential drawings illustrating a process for mending a punctured tire by the use of the tool of the invention.
Figure 4:
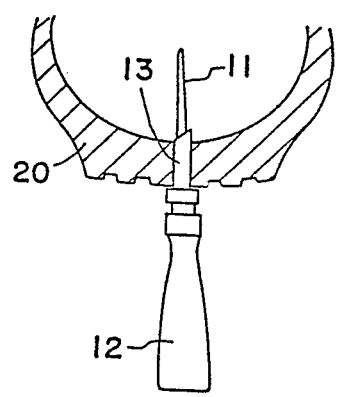

First, insert the pointed end of the tool assembled as in FIG. 2 in a puncture 21 of a tire 20 shown in FIG. 3. (FIG. 4) The tool may be required to pass through layers of tire steel cords and others. If the distal end of the sheath 13 is cut at a right angle to the axis thereof, the tool cannot turn through because it gets caught at the sheath cut by steel cords. However, if the sheath 13 is given a taper cut, the tool can relatively easily get through the steel cord layer by turning the tool into the puncture.

Figure 5:
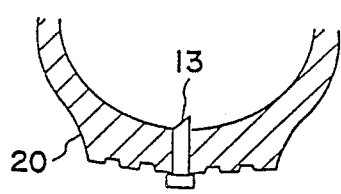
Figure 5:
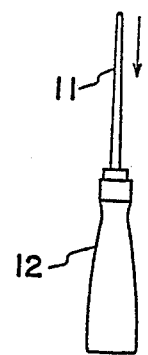
Figure 6:
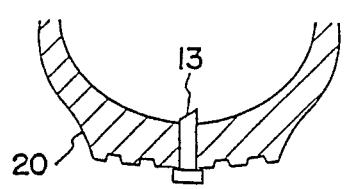
Figure 6:
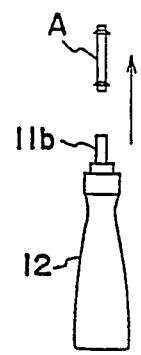

After the complete insertion of the tool point into the puncture 21 disengage the holder 12 from the sheath 13 as shown in FIG. 5 to remove the holder 12 and the rod 11 leaving only the sheath 13 in the puncture 21.

Then, reinsert the tool rod 11 in the holder 12 in such a way that the push rod 11b is the end of the tool rod 11 which projects from the holder 12, and push, by means of the push rod 11b, a filling plug A coated with vulcanization accelerant into the sheath guide 13 left in the puncture. Hence, the filling plug A is guided inside the sheath 13, thereby protecting the vulcanization accelerant from getting wiped away. The length of the push rod 11b is predetermined so that the push rod 11b projects from the holder 12 to an extent that the flanged part 2 of the plug A comes slightly out of the distal end of the sheath 13 when the push rod 11b is completely pushed into the sheath 13.

Figure 7:
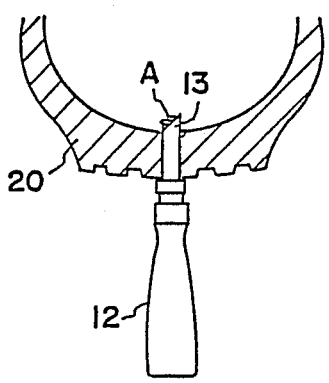
Figure 8:
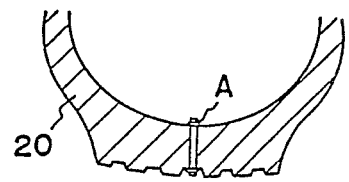
Figure 8:
Figure 9:
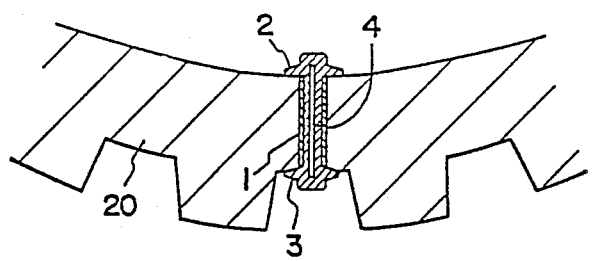
FIG. 9 is an enlarged view of the main part of FIG. 8.
Figure 10:
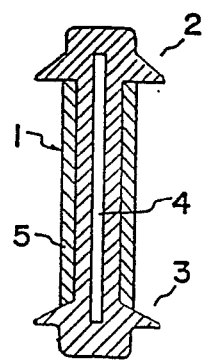
FIG. 10 is an enlarged section of the filling plug.

Next, turn the holder 12 to engage with the sheath 13 (FIG. 7) and pull out the sheath 13 and the holder 12 together, which leaves only the plug A in the puncture 21 of the tire 20. (FIGS. 8 and 9)

Although the drawings show the flanged end 2 of the plug A is slightly projected into the inside of the tire, the flanged part 2 remains an appropriate length in the puncture 21 depending on the thickness of the tire. The flanged part 2 acts as a stopper against ejection of the plug A from the tire due to centrifugal force while running this together with the deformation of unvulcanized rubber subjected to the vulcanization process during running results in the secure filling of the puncture by the plug.

In this way, the unvulcanized part of the plug A gets subjected to accelerated vulcanization due to the frictional heat generated in the tire while running, causing the plug to integrate with the tire rubber in the process from the viscous to the curing state of the unvulcanized part.

As described above, the invention can provide effects listed below:

(1) The entire puncture mending process can be completed simply by re-attaching three types of tool members in sequence to the holder. All the members are used until the completion of the process, which can eliminate mislaying of any member and provide for a highly efficient operation.

(2) The sheath guide beveled at the point permits the tool rod to pass through the steel cord layer of a tire with relative ease.

(3) The hollow holder can accommodate all the components and fittings such as filling plugs. This design makes it possible to put all the members together into one tool when not in use and reduce the volume of molding material used. Additionally, the tool is small and light and convenient for travelling on a vehicle such as a motorcycle without any spare tire on.

(4) The design of the holder and the tool separately constructed has eliminated the need of insert-molding resin and metal as with conventional tools and can make for light weight and mass production along with a simplified manufacturing process and cost reduction.

INDUSTRIAL FEASIBILITY OF THE INVENTION

The invention can be utilized as a puncture mending tool of tubeless tires in the automobile industry. Since the holder is of plastic and the tool rod is of metal such as steel, the tools can be manufactured in the plastics and metals industries.

What I claim is:

1. A tire puncture mending tool for inserting filling plugs into a tire comprising a tool rod having a distal end and a proximal end, said distal end having a pointed end section and a juxtaposed section having grooves, said proximal end having a blunt end section and a juxtaposed section formed with turn preventive-stopper means, a holder means formed as a handle and having a distal end and a proximal end, said holder means being hollow and having an interior compartment, said holder means having a removable cap on said proximal end for providing access to said interior compartment, said distal end of said holder means having a generally cylindrical section, said holder means having an axial passage disposed axially of said generally cylindrical section and extending into said interior compartment of said holder means, said axial passage having a portion extending through said generally cylindrical section and formed with a plurality of elongated keyways, said generally cylindrical section of said holder means having an external side formed with male threads such that said male threads are disposed generally radially outwardly of said keyways in said axial passage, a sheath having a proximal end and a distal end, said sheath having a longitudinal axis, said distal end of said sheath having a beveled terminating end such that said terminating end is disposed at an acute angle relative to said longitudinal axis, said proximal end of said sheath having female threads matable with said male threads on said generally cylindrical section of said holder means, said sheath having an interior passage slidably receiving said tool rod, said tool rod having a first operable position in which said tool rod has its proximal end inserted into said holder means such that said proximal end is disposed in said interior compartment of said holder means and said turn preventive-stopper means engages said keyways to limit the extent of insertion of said tool rod into said holder means and to preclude relative rotation between said tool rod and said holder means, said distal end of said tool rod extending externally of said holder means where said tool rod is in said first operable position, said tool rod having a second operable position in which said tool rod has its distal end inserted into said holder means such that said distal end is disposed in said interior compartment of said holder means and said turn preventive-stopper means engages said keyways to limit the extent of insertion of said tool rod into said holder means and to preclude relative rotation between said tool rod and said holder means, said proximal end of said tool rod extending externally of said holder means when said tool rod is in said second operable position, said sheath being mountable and removable from said holder means by engaging and disengaging said male and female threads while said tool rod is in either of said first and second operable positions, said interior compartment of said holder means having a larger diameter than said tool rod such that said interior compartment has storage space to receive items of storage such as said filling plugs when said tool rod is in either one of said two operable positions, said removable cap providing access to said items of storage in said storage space.

2. A tire puncture mending tool according to claim 1, wherein said distal end of said tool rod with its pointed end section and its grooves is used for puncturing a hole in said tire when said tool rod is in said first operable position, said proximal end of said tool rod with its blunt end section being used as a push rod to push in said filling plug into said tire when said tool rod is in said second operable position.

* * * * *